US012769044B2

(12) United States Patent
Li et al.

(10) Patent No.: US 12,769,044 B2
(45) Date of Patent: Oct. 20, 2026

(54) OPTICAL FILM, POLARIZER AND DISPLAY DEVICE

(71) Applicant: Shenzhen China Star Optoelectronics Semiconductor Display Technology Co., Ltd., Shenzhen (CN)

(72) Inventors: Hanming Li, Shenzhen (CN); Hongshan Yin, Shenzhen (CN); Chengzhong Yu, Shenzhen (CN); Fang Tan, Shenzhen (CN); Chunliu Yang, Shenzhen (CN); Ji Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 232 days.

(21) Appl. No.: 18/510,548

(22) Filed: Nov. 15, 2023

(65) Prior Publication Data

US 2025/0102719 A1 Mar. 27, 2025

(30) Foreign Application Priority Data

Sep. 25, 2023 (CN) ........................ 202311236547.7

(51) Int. Cl.
*G02B 5/30* (2006.01)

(52) U.S. Cl.
CPC .................................. *G02B 5/3083* (2013.01)

(58) Field of Classification Search
CPC ...... G02B 5/3083; G02B 5/30; G02B 5/3033; G02B 5/305; G02F 1/133528; G02F 1/13363; H10K 59/879
See application file for complete search history.

(56) References Cited

U.S. PATENT DOCUMENTS

| | | | |
|---|---|---|---|
| 2007/0229953 | A1 | 10/2007 | Chen et al. |
| 2018/0081082 | A1 | 3/2018 | Koma et al. |

FOREIGN PATENT DOCUMENTS

| | | | | |
|---|---|---|---|---|
| CN | 108603961 | A | 9/2018 | |
| CN | 116107011 | A | 5/2023 | |
| CN | 116520465 | A | 8/2023 | |
| DE | 112006002503 | T5 | 7/2008 | |
| EP | 2742372 | B1 | 9/2015 | |
| JP | 2005227427 | A | 8/2005 | |
| JP | 2006317733 | A * | 11/2006 | ........... G02B 5/3033 |
| JP | 2010128166 | A | 6/2010 | |
| JP | 2016218488 | A | 12/2016 | |
| JP | 2017134094 | A | 8/2017 | |
| JP | 2018194741 | A | 12/2018 | |

(Continued)

OTHER PUBLICATIONS

German Office Action issued in corresponding German Patent Application No. 10 2023 132 591.4 dated Apr. 4, 2024, pp. 1-5.

(Continued)

*Primary Examiner* — Collin X Beatty

(74) *Attorney, Agent, or Firm* — PV IP PC; Christopher Ruprecht; Wei Te Chung

(57) ABSTRACT

An optical film, a polarizer, and a display device are provided. The optical film includes a base material and adjusting particles dispersed in the base material. The optical film has an in-plane retardation value, and the in-plane retardation value of the optical film is less than 3000 nm.

20 Claims, 3 Drawing Sheets

(56) References Cited

FOREIGN PATENT DOCUMENTS

| | | | | |
|---|---|---|---|---|
| JP | 2022179612 | A | 12/2022 | |
| KR | 20070013272 | A | 1/2007 | |
| WO | 2013133102 | A1 | 9/2013 | |
| WO | WO-2023032373 | A1 * | 3/2023 | ........... G02F 1/1335 |

OTHER PUBLICATIONS

Japanese Office Action issued in corresponding Japanese Patent Application No. 特願 2024-106498 dated May 13, 2025, pp. 1-5.
Chinese Office Action issued in corresponding Chinese Patent Application No. 202311236547.7 dated Nov. 18, 2023, pp. 1-11.
Japanese Office Action issued in corresponding Japanese Patent Application No. 特願 2024-106498 dated Sep. 30, 2025, pp. 1-4.
Japanese Office Action issued in corresponding Japanese Patent Application No. 特願 2024-106498 dated Feb. 3, 2026, pp. 1-4.
Korean Office Action issued in corresponding Korean Patent Application No. 10-2024-0097547 dated Mar. 18, 2026, pp. 1-7.
Indian Office Action issued in corresponding Indian Patent Application No. 202314077898 dated Jun. 8, 2026, pp. 1-8.

* cited by examiner

OPTICAL FILM, POLARIZER AND DISPLAY DEVICE

CROSS-REFERENCE TO RELATED APPLICATION

This application claims priority to and the benefit of Chinese Patent Application No. 202311236547.7, filed on Sep. 25, 2023, the disclosure of which is incorporated herein by reference in its entirety.

TECHNICAL FIELD

The present disclosure relates to a field of display technologies, and in particular, to an optical film, a polarizer, and a display device.

BACKGROUND

Currently, a polarizer usually has a polarizing layer, and an optical film is used as a protective layer of the polarizing layer to protect the polarizing layer. However, the optical film used for the protective layer has birefringence or the like, so there is a problem in that the rainbow stripe occurs when the display device is viewed in an oblique direction after the polarizer is applied to the display device, and deterioration of the display quality of the display device is further caused.

Accordingly, there is a need for an optical film, a polarizer, and a display device to solve the above-mentioned technical problems.

SUMMARY

According to some embodiments of the present disclosure, it is provided an optical film, a polarizer, and a display device, which can alleviate the technical problem of reducing the display quality of a display device due to the rainbow stripe caused by the optical film.

An optical film includes: a base material; and adjusting particles dispersed within the base material; in which the optical film has an in-plane retardation value, and the in-plane retardation value of the optical film is less than 3000 nm.

In some embodiments, the in-plane retardation value of the optical film is less than or equal to 1000 nm.

In some embodiments, the in-plane retardation value of the optical film is less than or equal to 500 nm.

In some embodiments, the in-plane retardation value of the optical film is less than or equal to 200 nm.

In some embodiments, the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

In some embodiments, the adjusting particles include a first type of adjusting particles and/or a second type of adjusting particles; for each of the first type of adjusting particles, the first type of adjusting particle has a plurality of first cross sections having respective first circumscribed circles, a ratio of a length of a long axis of the first type of adjusting particle to a diameter of one of the first circumscribed circles which has a largest diameter is greater than or equal to 1, and the ratio of the length of the long axis of the first type of adjusting particle to the diameter of the one of the first circumscribed circles which has the largest diameter is less than 5; for each of the second type of adjusting particles, the second type of adjusting particle has a plurality of second cross sections having respective second circumscribed circles, a ratio of a length of a long axis of the second type of adjusting particle to a diameter of one of the second circumscribed circles which has a largest diameter is greater than or equal to 5, and the ratio of the length of the long axis of the second type of adjusting particle to the diameter of the one of the second circumscribed circles which has the largest diameter is less than or equal to 50.

In some embodiments, the first type of adjusting particle includes at least one type selected from a first sub-type of adjusting particle, a second sub-type of adjusting particle, a third sub-type of adjusting particle, a fourth sub-type of adjusting particle, and a fifth sub-type of adjusting particle which are different in shape from each other; and the second type of adjusting particle includes at least one type selected from a sixth sub-type of adjusting particle, a seventh sub-type of adjusting particle, an eighth sub-type of adjusting particle, a ninth sub-type of adjusting particle, and a tenth sub-type of adjusting particle which are different in shape from each other; in which a variation value of diameters of the first circumscribed circles of the first cross sections of the first sub-type adjusting particle is less than or equal to 0.3 μm along an extension direction of a long axis of the first sub-type adjusting particle; a first portion and a second portion of the second sub-type adjusting particle are connected with each other, diameters of the first circumscribed circles of the first cross sections of the first portion of the second sub-type adjusting particle gradually decrease in a direction away from the second portion of the second sub-type adjusting particle, and diameters of the first circumscribed circles of the first cross sections of the second portion of the second sub-type adjusting particle gradually decrease in a direction away from the first portion of the second sub-type adjusting particle; a variation value of diameters of the first circumscribed circles of the first cross sections of a middle portion of the third sub-type adjusting particle is less than or equal to 1 μm in an extension direction of a long axis of the third sub-type adjusting particle; in a direction away from the middle portion of the third sub-type adjusting particle, diameters of the first circumscribed circles of the first cross sections of a first portion of the third sub-type adjusting particle gradually decrease, and a variation value of diameters of the first circumscribed circles of the first cross sections of a second portion of the third sub-type adjusting particle is less than or equal to 1 μm; a variation value of diameters of the first circumscribed circles of the first cross sections of a middle portion of the fourth sub-type adjusting particle is less than or equal to 1 μm in an extension direction of a long axis of the fourth sub-type adjusting particle; in a direction away from the middle portion of the fourth sub-type adjusting particle, diameters of the first circumscribed circles of the first cross sections of a first portion of the fourth sub-type adjusting particle gradually decrease, and diameters of the first circumscribed circles of the first cross sections of a second portion of the fourth sub-type adjusting particle gradually decrease; a first portion and a second portion of the fifth sub-type adjusting particle are connected to each other, and diameters of the first circumscribed circles of the first cross sections of the fifth sub-type adjusting particle gradually decrease along a direction from the first portion of the fifth sub-type adjusting particle to the second portion of the fifth sub-type adjusting particle; a variation value of diameters of the second circumscribed circles of the second cross sections of the sixth sub-type adjusting particle is less than or equal to 0.3 μm along an extension direction of a long axis of the sixth sub-type adjusting particle; a variation value of diameters of the second circumscribed circles of the second cross sections of a middle portion of the seventh sub-type adjusting particle is less than or equal to 1 μm in an extension direction of a long axis of the seventh sub-type adjusting particle; in a direction away from the middle portion of the seventh sub-type adjusting particle, diameters of the second circumscribed circles of the second cross sections of a first portion of the seventh sub-type adjusting particle gradually decrease, and a variation value of diameters of the second circumscribed circles of the second cross sections of a second portion of the seventh sub-type adjusting particle is less than or equal to 1 μm; a variation value of diameters of the second circumscribed circles of the second cross sections of a middle portion of the eighth sub-type adjusting particle is less than or equal to 1 μm along an extension direction of a long axis of the eighth sub-type adjusting particle; in a direction away from the middle portion of the eighth sub-type adjusting particle, diameters of the second circumscribed circles of the second cross sections of a first portion of the eighth sub-type adjusting particle gradually decrease, and diameters of the second circumscribed circles of the second cross sections of a second portion of the eighth sub-type adjusting particle gradually decrease; a first portion and a second portion of the ninth sub-type adjusting particle are connected to each other, and diameters of the second circumscribed circles of the second cross sections of the ninth sub-type adjusting particle gradually decrease in a direction from the first portion of the ninth sub-type adjusting particle to the second portion of the ninth sub-type adjusting particle; a first portion and a second portion of the tenth sub-type adjusting particle are connected to each other, diameters of the second circumscribed circles of the second cross sections of the first portion of the tenth sub-type adjusting particle gradually decrease in a direction away from the second portion of the tenth sub-type adjusting particle, and diameters of the second circumscribed circles of the second cross sections of the second portion of the tenth sub-type adjusting particle gradually decrease in a direction away from the first portion of the tenth sub-type adjusting particle.

In some embodiments, the adjusting particles include the first type of adjusting particles and the second type of adjusting particles, a mass fraction of the first type of adjusting particles in the adjusting particles is greater than 50%, and a mass fraction of the second type of adjusting particles in the adjusting particles is less than 50%.

In some embodiments, the base material includes a first sub-base material and/or a second sub-base material, the first sub-base material is selected from at least one of an unmodified polyester or an unmodified cellulose acetate, and the second sub-base material is selected from at least one of a modified polyester or a modified cellulose acetate; in which a mass fraction of the first sub-base material in the base material is greater than or equal to 65%, and a mass fraction of the first sub-base material in the base material is less than or equal to 100%; a mass fraction of the second sub-base material in the base material is greater than or equal to 0%, and a mass fraction of the second sub-base material in the base material is less than or equal to 35%.

According to some embodiments of the present disclosure, it is further provided a polarizer including the above-mentioned optical film.

According to some embodiments of the present disclosure, it is further provided a display device including the above-mentioned polarizer.

The present disclosure aims to reduce the difference between the in-plane retardation value and the thickness-direction retardation value of the optical film by adding the adjusting particles into the base material of the optical film, thereby improving the rainbow strip problem caused by the optical film.

BRIEF DESCRIPTION OF THE DRAWINGS

In order that the technical solution in the embodiments of the present disclosure may be more clearly described, references will now be made briefly to the accompanying drawings required for the description of the embodiments, and it will be apparent that the accompanying drawings in the description below are only some of the embodiments of the present disclosure, and other drawings may be made to those skilled in the art without involving any inventive effort.

DETAILED DESCRIPTION

Figure 1:
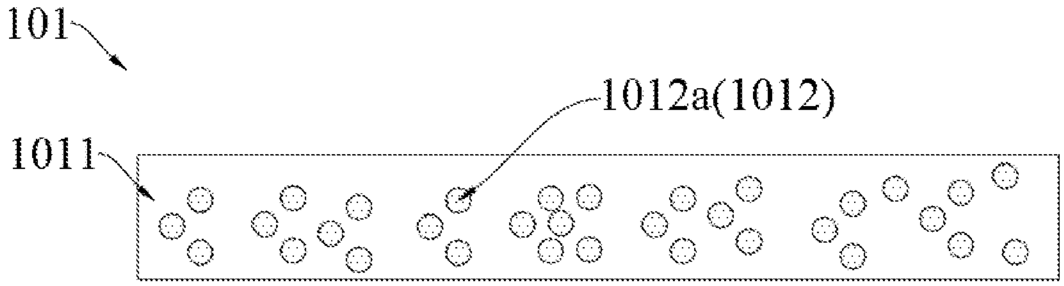
FIG. 1 is a first structural diagram of an optical film according to some embodiments of the present disclosure.

The technical solution in the embodiments of the present disclosure will now be described more clearly and completely, with reference to the accompanying drawings in these embodiments. Obviously, the described embodiments are only some of the embodiments of the present disclosure, rather than all of the embodiments. Based on the embodiments of the present disclosure, all other embodiments obtained by a person skilled in the art without involving any inventive effort are within the scope of the present disclosure. Furthermore, it is to be understood that the specific embodiments described herein are merely illustrative and explanatory of the disclosure and are not intended to limit the disclosure. In the present disclosure, unless otherwise specified, the directional words used such as “upper” and “lower” usually refer to the upper and lower positions with respect to the device in actual use or working conditions, specifically to the direction in the drawings; while “inside” and “outside” refer to the outline of the device. It should be understood that “and/or” describing the association relationship of the associated objects, indicates that there may be three relationships, for example, A and/or B may indicate that there are three cases where A exists separately, A and B exist at the same, and B exists separately.

Currently, an optical film for a protective layer of a polarizing layer has birefringence or the like, so there is a problem that the rainbow stripe occurs when a display device is viewed in an oblique direction after a polarizer is applied to the display device, and deterioration of the display quality of the display device is further caused.

Figure 2:
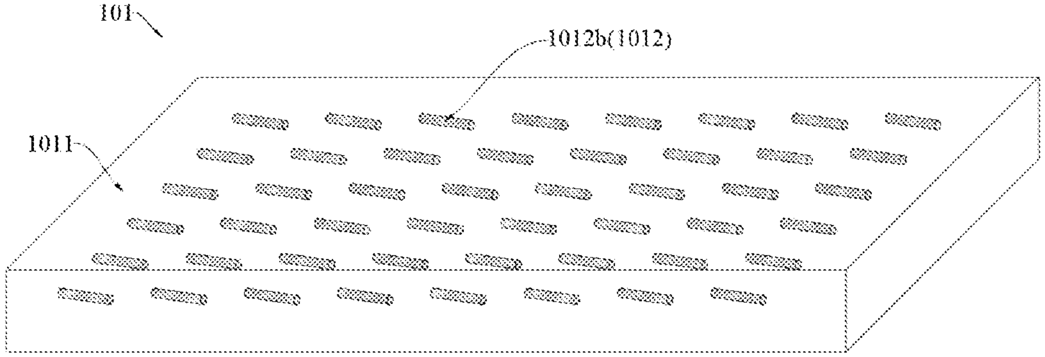
FIG. 2 is a second structural diagram of an optical film according to some embodiments of the present disclosure.
Figure 3:
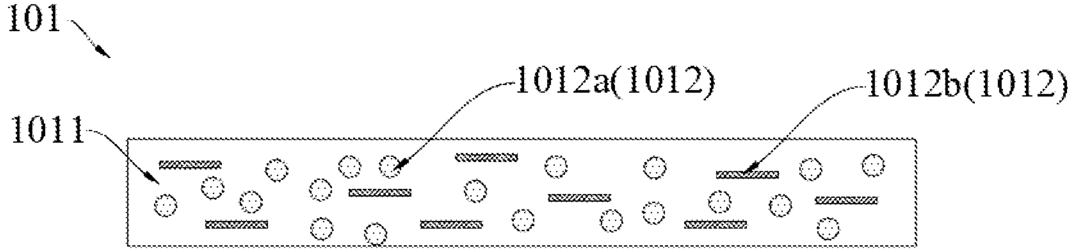
FIG. 3 is a third structural diagram of an optical film according to some embodiment of the present disclosure.

Referring to FIGS. 1-3, according to some embodiments of the present disclosure, it is provided an optical film 101 including a base material 1011 and adjusting particles 1012 dispersed within the base material 1011. The optical film 101 has an in-plane retardation value, and the in-plane retardation value of the optical film 101 is less than 3000 nm.

According to the embodiments of the present disclosure, the adjustment particles 1012 are added to the base material 1011 of the optical film 101 to reduce the in-plane retardation value of the optical film to less than 3000 nm. In this way, the difference between the in-plane retardation value of the optical film 101 and a thickness-direction retardation value of the optical film 101 is reduced, thereby improving the rainbow strip problem caused by the optical film 101.

The technical solution of the present disclosure will now be described with reference to specific examples.

In this example, the in-plane retardation value of the optical film 101 is a retardation value of the optical film 101 in a plane in which the optical film 101 is located. The plane in which the optical film 101 is located is perpendicular to a thickness direction of the optical film 101. The optical film 101 has a thickness-direction retardation value in the thickness direction of the optical film 101. When light rays pass through the optical film 101, a difference between the refractive index of the light rays in the plane in which the optical film 101 is located and the refractive index of the light rays in the thickness direction of the optical film 101 causes a difference between the in-plane retardation value and the thickness-direction retardation value of the optical film 101. When the in-plane retardation value of the optical film 101 is greater than or equal to 3000 nm, the in-plane retardation value of the optical film 101 differs greatly from the thickness-direction retardation value of the optical film 101. When light rays pass through the optical film 101, when the optical film is viewed at a large angle (e.g., at an intersection angle 45° or 60° with respect to the thickness direction of the optical film 101), the rainbow strip is occurred. By adding the adjusting particles 1012, the difference between the refractive index of the light rays in the plane in which the optical film 101 is located and the refractive index of the light rays in the thickness direction of the optical film 101 is reduced, so that the in-plane retardation value of the optical film 101 is less than 3000 nm, thereby improving the rainbow strip problem of the optical film 101 in the large-angle direction, and further improving the display quality of the display device having the optical film 101.

In some embodiments, the in-plane retardation value of the optical film 101 may be calculated by a following formula:

$$Re = d \times |n_x - n_y|$$

where Re denotes the in-plane retardation value of the optical film 101, $n_x$ denotes a refractive index of an extraordinary ray, $n_y$ denotes a refractive index of an ordinary ray, and d denotes a thickness of the optical film 101.

In some embodiments, it may be obtained that a difference between the refractive index of the extraordinary ray and the refractive index of the ordinary ray on the optical film 101 by a phase delay measuring instrument (e.g., Optipro-micro of shintech Corporation) under a white light source with a continuous spectrum, and thus the in-plane retardation value of the optical film 101 may be obtained based on the above formula.

In some embodiments, the thickness-direction retardation amount of the optical film 101 may be an average value of anisotropic values (i.e. $\Delta N_{xz}=\Delta|n_x-n_z|$ and $\Delta N_{yz}=\Delta|n_y-n_z|$) of two sets of refractive indices of the optical film 101 multiplying by the thickness of the optical film 101 respectively, where the two sets of refractive indices are measured and obtained when observed from a cross section perpendicular to the plane in which the optical film 101 is located, and $n_z$ denotes a thickness-direction refractive index of the optical film 101.

In some embodiments, the in-plane retardation value of the optical film 101 is greater than or equal to 0 nm, and the in-plane retardation value of the optical film 101 is less than or equal to 1000 nm, which facilitates to further reduce the difference between the in-plane retardation value of the optical film 101 and the thickness-direction retardation value of the optical film 101. For example, the in-plane retardation value of the optical film 101 may be 20 nm, 50 nm, 100 nm, 120 nm, 150 nm, 200 nm, 220 nm, 250 nm, 300 nm, 320 nm, 350 nm, 400 nm, 420 nm, 450 nm, 500 nm, 520 nm, 550 nm, 600 nm, 620 nm, 650 nm, 700 nm, 720 nm, 750 nm, 800 nm, 820 nm, 850 nm, 900 nm, 920 nm, 950 nm, etc. In this way, the rainbow strip problem of the optical film 101 in the large angle direction is effectively improved, and the display quality of the display device having the optical film 101 is also improved. Optionally, the in-plane retardation value of the optical film 101 is greater than or equal to 0 nm, and the in-plane retardation value of the optical film 101 is less than or equal to 500 nm, which further effectively improves the rainbow strip problem of the optical film 101 in the large angle direction and improves the display quality of the display device having the optical film 101. More optionally, the in-plane retardation value of the optical film 101 is greater than or equal to 0 nm, and the in-plane retardation value of the optical film 101 is less than or equal to 200 nm. In this way, the range of the in-plane retardation value of the optical film 101 is closest to the range of the thickness-direction retardation value of the optical film 101, thereby most effectively improving the rainbow strip problem of the optical film 101 in the large angle direction and improving the display quality of the display device having the optical film 101.

In some embodiments, when a ratio of the in-plane retardation value of the optical film 101 to the thickness-direction retardation value of the optical film 101 is closer to 1, the smaller the difference between the refractive indexes of the light rays in the plane in which the optical film 101 is located and the refractive indexes of the light rays in the thickness-direction of the optical film 101 is, so that it is to eliminate the rainbow strip problem more easily. The ratio of the in-plane retardation value of the optical film 101 to the thickness-direction retardation value of the optical film 101 is greater than 0.1, and the ratio of the in-plane retardation value of the optical film 101 to the thickness-direction retardation value of the optical film 101 is less than 2. For example, the ratio may be 0.2, 0.5, 0.6, 0.8, 1, 1.2, 1.4, 1.5, 1.6, 1.8, or the like, so that the rainbow strip problem can be effectively improved. Optionally, when the ratio of the in-plane retardation value of the optical film 101 to the thickness-direction retardation value of the optical film 101 is greater than or equal to 0.5 and the ratio of the in-plane retardation value of the optical film 101 to the thickness-direction retardation value of the optical film 101 is less than or equal to 1.5, the occurrence of the rainbow strip problem can be substantially avoided. More optionally, when the ratio of the in-plane retardation value of the optical film 101 to the thickness-direction retardation value of the optical film 101 is greater than or equal to 0.6, and the ratio of the in-plane retardation value of the optical film 101 to the thickness-direction retardation value of the optical film 101 is less than or equal to 1.2, the rainbow strip problem can be completely eliminated.

In some embodiments, the base material 1011 is selected from at least one of a modified or modified polyester, or a modified or unmodified cellulose acetate.

In some embodiments, the modified or unmodified polyester may include at least one of modified or unmodified polyethylene terephthalate, modified or unmodified polycarbonate, modified or unmodified poly(methyl methacrylate), modified or unmodified poly(ethylene naphthalate). Modified or unmodified cellulose acetate may include modified or unmodified cellulose triacetate.

In some embodiments, the base material 1011 may include a first sub-base material and/or a second sub-base material. The first sub-base material may be selected from at least one of an unmodified polyester or an unmodified cellulose acetate. The second sub-base material may be selected from at least one of a modified polyester and/or a modified cellulose acetate. In the base material 1011, a mass fraction of the first sub-base material is greater than a mass fraction of the second sub-base material.

In some embodiments, the first sub-base material and the second sub-base material are uniformly mixed with each other, and the mass fraction of the first sub-base material in the base material 1011 is greater than or equal to 65%, and for example, may be 70%, 75%, 80%, 85%, 90%, 95%, 99%, etc. The mass fraction of the second sub-base material within the base material 1011 is less than or equal to 35%, and for example, may be 1%, 5%, 10%, 15%, 20%, 25%, 30%, etc. A modified polyester such as polyethylene terephthalate and an unmodified polyester such as polyethylene terephthalate are well-miscible. Or, the unmodified cellulose acetate such as cellulose triacetate is well-miscible with the unmodified cellulose acetate such as cellulose triacetate. In this way, the mechanical, the flatness, the crystallinity of the base material 1011 and the dispersion of the adjusting particles 1012 are helped to be improved, thereby improving the optical properties of the optical film 101.

In some embodiments, the modified cellulose triacetate, modified polyethylene terephthalate, modified polycarbonate, modified polymethacrylate, or modified poly(ethylene naphthalate) can be obtained by hydrophilic or lipophilic modification of unmodified cellulose triacetate, unmodified polyethylene terephthalate, unmodified polycarbonate, unmodified polymethacrylate, or unmodified poly(ethylene naphthalate), respectively. For example, the modified polyethylene terephthalate may be obtained by introducing a straight alkyl side chain, a carboxyl side chain, a hydroxyl side chain, or a side chain of a fluorine-containing group into the unmodified polyethylene terephthalate. When the modified polyethylene terephthalate may be obtained by introducing a carboxyl side chain and/or a hydroxyl side chain into the unmodified polyethylene terephthalate, the modified polyethylene terephthalate may be obtained by introducing groups denoted by chemical formulae $$-(CH_2)_n-OH \text{ and } -(CH_2)_m-COOH$$

respectively into the phenyl group of the unmodified polyethylene terephthalate, where n and m are both integers greater than or equal to 0 and less than or equal to 10.

In some embodiments, when the first sub-base material is unmodified polyethylene terephthalate, the second sub-base material is modified polyethylene terephthalate, which facilitates the modified polyethylene terephthalate and the unmodified polyethylene terephthalate to have good miscibility. In this way, the mechanical, the flatness, the crystallinity of the base material 1011 and the dispersion of the adjusting particles 1012 are helped to be improved, thereby improving the optical properties of the optical film 101.

In some embodiments, the adjusting particles 1012 each have a long axis and a diameter. The length of the long axis of the adjusting particle 1012 is the spacing between two ends of the long axis of the adjusting particles 1012. Each of the adjusting particles 1012 has multiple cross sections, which are taken along a direction perpendicular to an extension direction of the long axis of the adjusting particle, in this extension direction. Each of the cross sections has an circumscribed circle, and a diameter of the adjusting particle 1012 corresponds to a diameter of one of the circumscribed circles of the multiple cross sections which has a largest diameter. Two farthest points in a cross section of the adjusting particle 1012 are located on the circumscribing circle of this cross section, and a distance between the two farthest points in this cross section is the diameter of the circumscribing circle. The adjusting particles 1012 include a first type of adjusting particles 1012*a*.

The first type of adjusting particles 1012*a* have multiple first cross sections. Each of the first sections has a first circumscribed circle. A ratio of a length of the long axis of the first type of adjusting particle 1012*a* to a diameter of the first circumscribed circle with the largest diameter is greater than or equal to 1, and the ratio of the length of the long axis of the first type of adjusting particle 1012*a* to the diameter of the first circumscribed circle with the largest diameter is less than 5. For example, this ratio may be 1.1, 1.2, 1.3, 1.4, 1.5, 1.6, 1.8, 1.9, 2, 2.2, 2.5, 2.8, 3, 3.5, 4, 4.5, etc. The first cross section is perpendicular to the extension direction of the long axis of the second type of adjusting particle 1012*b*. By making the adjusting particles 1012 include the first-type adjusting particles 1012*a* having a smaller length-to-diameter ratio (i.e., a ratio of the length of the long axis to the diameter of the first circumscribed circle with the largest diameter), it is advantageous to effectively reduce the in-plane retardation value of the optical film 101 to less than 3000 nm. In this way, the difference between the in-plane retardation value of the optical film 101 and the thickness-direction retardation value of the optical film 101 may be effectively reduced, the rainbow strip problem of the optical film 101 may be improved, and the display quality of the display device having the optical film 101 may be improve.

In some embodiments, the first type of adjusting particle 1012*a* includes at least one type selected from a first sub-type of adjusting particle, a second sub-type of adjusting particle, a third sub-type of adjusting particle, a fourth sub-type of adjusting particle, and a fifth sub-type of adjusting particle that differ in shape from each other.

A variation value of diameters of a first circumscribed circles of the first cross sections of the first sub-type adjusting particle is less than or equal to 0.3 μm along an extension direction of a long axis of the first sub-type adjusting particle. For example, the variation value may be 0 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In some embodiments, diameters of the first circumscribed circles of the first cross sections of the first portion of the first sub-type adjusting particle are the same as diameters of the first circumscribed circles of the first cross sections of the middle portion of the first sub-type adjusting particle. And, diameters of the first circumscribed circles of the first cross sections of the second portion of the first sub-type adjusting particle are the same as the diameters of the first circumscribed circles of the first cross sections of the middle portion of the first sub-type adjusting particle.

In some embodiments, the first cross section of the first sub-type of adjusting particle may be a regular shape or a random shape, such as a circle, an ellipse, a triangle, a quadrilateral, or the like.

In some embodiments, the first sub-type of adjusting particle is a cube-like particle or a cuboid-like particle. The first cross section of the first sub-type of adjusting particle is a square or a rectangle. A diameter of a first circumscribed circle of any one of first cross sections of the first sub-type of adjusting particle is a diagonal length of the square or the rectangle presented by this one first cross section.

The ratio of the length of the long axis of the first sub-type adjusting particle to the diameter of the first circumscribed circle, which has the largest diameter, of the first sub-type adjusting particle is more preferably close to 1, for example, 1.1, 1.2, 1.3, 1.4, 1.5, 1.6, 1.7, 1.8, 1.9, 2, 2.2, 2.5, 3, etc.

A first portion and a second portion of the second sub-type adjusting particle are connected to each other. Diameters of first circumscribed circles of the first cross sections of the first portion of the second sub-type adjusting particle gradually decrease in a direction away from the second portion of the second sub-type adjusting particle. And, diameters of first circumscribed circles of the first cross sections of the second portion of the second sub-type adjusting particle gradually decrease in a direction away from the first portion of the second sub-type adjusting particle.

It will be appreciated that the diameters of the first circumscribed circles of the first cross sections of the first portion of the second sub-type adjusting particle decrease gradually in a direction away from the second portion of the second sub-type adjusting particle, which indicates a tendency of the diameters of the first circumscribed circles of the first cross sections of the first portion of the second sub-type adjusting particle to decrease in a direction away from the second portion of the second sub-type adjusting particle. This tendency includes, but not limited to, the diameters of the first circumscribed circles of the first cross sections of the second sub-type adjusting particle decrease in sequence in a direction away from the second portion of the second sub-type adjusting particle.

It will be appreciated that the diameters of the first circumscribed circles of the first cross sections of the second portion of the second sub-type of adjusting particle decrease gradually in a direction away from the first portion of the second sub-type of adjusting particle, which indicates a tendency of the diameters of the first circumscribed circles of the first cross sections of the second portion of the second sub-type of adjusting particle to decrease in a direction away from the first portion of the second sub-type of adjusting particle. This tendency includes, but not limited to, the diameters of the first circumscribed circles of the first cross sections of the second portion of the second sub-type of adjusting particle sequentially decrease in a direction away from the first portion of the second sub-type of adjusting particle.

In some embodiments, the first cross section of the second sub-type of adjusting particle may be a regular shape or a random shape such as a circle, an ellipse, a triangle, a quadrilateral, or the like.

In some embodiments, the second sub-type of adjusting particles are spherical particles or ellipsoidal particles, and the first cross section of the second sub-type of adjusting particle is circular or ellipsoidal. When the first cross section of the second sub-type of adjusting particle is elliptical, the ratio of the long axis of the elliptical shape of any of the first cross sections of the second sub-type of adjusting particles to the minor axis of this elliptical shape is greater than 1, and less than or equal to 3, and for example, may be 1.2, 1.5, 1.8, 2, 2.2, 2.5, 2.8, etc. When the second sub-type adjusting particle is a spherical particle, any one of the first cross sections of the second sub-type adjusting particle is circular, and a first circumscribed circle of any one of first cross section coincides with this one first cross section. And, a ratio of a long axis of the second sub-type adjusting particle to a diameter of a first circumscribed circle of the second sub-type adjusting particle which has a largest diameter is 1.

The ratio of the length of the long axis of the second sub-type adjusting particle to the diameter of the first circumscribed circle with the largest diameter among the plurality of first circumscribed circles of the second sub-type adjusting particle is preferably close to 1. When the second sub-type adjusting particle is an ellipsoidal particle, the shape of the second sub-type adjusting particle is more preferably similar to that of the spherical particle. That is, it is better that the length of the long axis of the second sub-type adjusting particle and the diameter of the second sub-type adjusting particle are closer. Optionally, the ratio of the length of the long axis of the second sub-type adjustment particle to the diameter of the first circumscribed circle with the largest diameter among the plurality of first circumscribed circles of the second sub-type adjustment particle is greater than or equal to 1, and the ratio of the length of the long axis of the second sub-type adjustment particle to the diameter of the first circumscribed circle with the largest diameter among the plurality of first circumscribed circles of the second sub-type adjustment particle is less than or equal to 3. More optionally, the ratio of the length of the long axis of the second sub-type adjustment particle to the diameter of the first circumscribed circle with the largest diameter among the plurality of the first circumscribed circles of the second sub-type adjustment particle is greater than or equal to 1, and the ratio of the length of the long axis of the second sub-type adjustment particle to the diameter of the first circumscribed circle with the largest diameter among the plurality of the first circumscribed circles of the second sub-type adjustment particle is less than or equal to 1.5.

Along an extension direction of the long axis of the third sub-type adjusting particle, the variation value of the diameters of the first circumscribed circles of the first cross sections of the middle portion of the third sub-type adjusting particle is less than or equal to 1 μm, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. The diameters of the first circumscribed circles of the first cross sections of the first portion of the third sub-type of adjusting particle gradually decrease in a direction away from the middle portion of the third sub-type of adjusting particle. The variation value of the diameters of the second portion of the third sub-type of adjusting particle is less than or equal to 1 μm, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In some embodiments, the diameters of the first circumscribed circles of the first cross sections of the first portion of the third sub-type adjusting particle gradually decrease in a direction away from the middle portion of the third sub-type adjusting particle, and the diameters of the first circumscribed circles of the first cross sections of the second portion of the third sub-type adjusting particle are the same as the diameters of the first circumscribed circles of the first cross sections of the middle portion of the third sub-type adjusting particle.

It will be appreciated that the diameters of the first circumscribed circles of the first cross sections of the first portion of the third sub-type adjusting particle gradually decrease in a direction away from the middle portion of the third sub-type adjusting particle, which indicates a tendency of the diameters of the first circumscribed circles of the first cross sections of the first portion of the third sub-type adjusting particle to decrease in a direction away from the middle portion of the third sub-type adjusting particle. The tendency includes, but not limited to, the diameters of the first circumscribed circles of the first cross sections of the first portion of the third sub-type adjusting particle sequentially decrease in the direction away from the middle portion of the third sub-type adjusting particle.

In some embodiments, the first cross section of the third sub-type of adjusting particle may be a regular shape or a random shape such as a circle, an ellipse, a triangle, a quadrilateral, or the like.

In some embodiments, the third sub-type of adjusting particle may be an acicular particle having a reduced diameter at one end thereof.

In some embodiments, when the third sub-type of adjusting particles are acicular particles each having a reduced diameter at one end thereof, and the first cross sections of the third sub-type of adjusting particle may be circular or elliptical. When the first cross sections of the second portion of the third sub-type of adjusting particle or the first cross sections of the middle portion of the third sub-type of adjusting particle are elliptical, the ratio of the long axis of an elliptical shape of any of the first cross sections of the second portion or any of the first cross sections of the middle portion of the third sub-type of adjusting particle to an minor axis of this elliptical shape is greater than 1 and less than or equal to 3, and for example, may be 1.2, 1.5, 1.8, 2, 2.2, 2.5, 2.8, etc. The shapes of the first cross sections of the first portion of the third sub-type adjusting particle coincide with the shapes of the first cross sections of the middle portion of the third sub-type adjusting particle, and the area of the first portion gradually decreases in a direction away from the middle portion of the third sub-type adjusting particle.

The variation value of the diameters of the first circumscribed circles of the first cross sections of the middle portion of the fourth sub-type of adjusting particle along the extension direction of the long axis of the fourth sub-type of adjusting particle is less than or equal to 1 μm, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, and the like. Diameters of first circumscribed circles of the first cross sections of the first portion of the fourth sub-type adjusting particle gradually decrease in a direction away from a middle portion of the fourth sub-type adjusting particle, and diameters of first circumscribed circles of the first cross sections of a second portion of the fourth sub-type adjusting particle gradually decrease. In some embodiments, the diameters of the first circumscribed circles of the first cross sections of the middle portion of the fourth sub-type adjusting particle are uniform along the extension direction of the long axis of the fourth sub-type adjusting particle, and the diameters of the first circumscribed circles of the first cross sections of both the first portion and the second portion of the fourth sub-type adjusting particle gradually change.

It will be appreciated that the diameters of the first circumscribed circles of the first cross sections of the first portion of the fourth sub-type adjusting particle gradually decrease in a direction away from the middle portion of the fourth sub-type adjusting particle, which indicates a tendency of the diameters of the first circumscribed circles of the first cross sections of the first portion of the fourth sub-type adjusting particle to decrease in a direction away from the middle portion of the fourth sub-type adjusting particle. This tendency includes, but not limited to, the diameters of the first circumscribed circles of the first cross sections of the first portion of the fourth sub-type adjusting particle sequentially decrease in the direction away from the middle portion of the fourth sub-type adjusting particle.

It will be appreciated that the diameters of the first circumscribed circles of the first cross sections of the second portion of the fourth sub-type adjusting particle gradually decrease in a direction away from the middle portion of the fourth sub-type adjusting particle, which indicates that the diameters of the first circumscribed circles of the first cross sections of the second portion of the fourth sub-type adjusting particle exhibits a decreasing tendency in a direction away from the middle portion of the fourth sub-type adjusting particle. The tendency includes, but not limited to, the diameters of the first circumscribed circles of the first cross sections of the second portion of the fourth sub-type adjusting particle sequentially decrease in a direction away from the middle portion of the fourth sub-type adjusting particle.

In some embodiments, the first cross section of the fourth sub-type of adjusting particle may be a regular shape or a random shape such as a circle, an ellipse, a triangle, a quadrilateral, or the like.

In some embodiments, the fourth sub-type of adjusting particles may be acicular particles each having a reduced diameter at two ends thereof.

In some embodiments, when the fourth sub-type adjusting particles are acicular particles each having a reduced diameter at both ends thereof, the shapes of the first cross sections of the fourth sub-type adjusting particles may be circular or elliptical. When the first cross sections of the middle portion of the fourth sub-type adjusting particle are elliptical, a ratio of the long axis of an elliptical shape of any of the first cross sections of the middle portion of the fourth sub-type adjusting particle to the minor axis of this elliptical shape is greater than 1 and less than or equal to 3, and for example, may be 1.2, 1.5, 1.8, 2, 2.2, 2.5, 2.8, etc. The shapes of the first cross sections of the first portion of the fourth sub-type adjusting particle, the shapes of the first cross sections of the second portion of the fourth sub-type adjusting particle, and the shapes of the first cross sections of the middle portion of the fourth sub-type adjusting particle are consistent, and the area gradually decreases in a direction away from the middle portion of the fourth sub-type adjusting particle.

A first portion and a second portion of the fifth sub-type adjusting particle are connected to each other, and diameters of first circumscribed circles of the first cross sections of the fifth sub-type adjusting particle gradually decrease along a direction from the first portion of the fifth sub-type adjusting particle to the second portion of the fifth sub-type adjusting particle.

It will be appreciated that the diameters of the first circumscribed circles of the first cross sections of the fifth sub-type adjusting particle decrease gradually along the direction from the first portion of the fifth sub-type adjusting particle to the second portion of the fifth sub-type adjusting particle, which indicates a tendency of the diameters of the first circumscribed circles of the first cross sections of the fifth sub-type adjusting particle to decrease in the direction from the first portion of the fifth sub-type adjusting particle to the second portion of the fifth sub-type adjusting particle. This tendency includes, but not limited to, the diameters of the first circumscribed circles of the first cross sections of the fifth sub-type adjusting particle sequentially decrease in the direction from the first portion of the fifth sub-type adjusting particle to the second portion of the fifth sub-type adjusting particle.

In some embodiments, the first cross section of the fifth sub-type of adjusting particle may be a regular shape or a random shape such as a circle, an ellipse, a triangle, a quadrilateral, or the like.

In some embodiments, the fifth sub-type of adjusting particles may be long cone-shaped particles.

In some embodiments, when the fifth sub-type of adjusting particles are long cone-shaped particles, the first cross sections of the fifth sub-type of adjusting particle are circular or elliptical. Along a direction from the first portion of the fifth sub-type adjusting particle to the second portion of the fifth sub-type adjusting particle, the fifth sub-type adjusting particle has a uniform shape and the areas of the first cross sections thereof gradually decrease. When the first cross sections of the fifth sub-type of adjusting particle are elliptical, the ratio of the long axis of the elliptical shape of any of the first cross sections of the fifth sub-type of adjusting particle to the minor axis of this elliptical shape is greater than 1 and less than or equal to 3, and for example, may be 1.2, 1.5, 1.8, 2, 2.2, 2.5, 2.8, etc.

In some embodiments, comparing with the third sub-type adjusting particle, the fourth sub-type adjusting particle and the fifth sub-type adjusting particle, the first sub-type adjusting particle and the second sub-type adjusting particle have a better improved effect of reducing the difference between the in-plane retardation value of the optical film 101 and the thickness-direction retardation value of the optical film 101. The second sub-type adjusting particle has a better improved effect than the first sub-type adjusting particle. Thus, optionally, the adjusting particles 1012 include the first sub-type adjusting particles and/or the second sub-type adjusting particles. When the adjusting particles 1012 include the first sub-type adjusting particles and the second sub-type adjusting particles, the mass fraction of the first sub-type adjusting particles in the adjusting particles 1012 is greater than the mass fraction of the second sub-type adjusting particles in the adjusting particles 1012. Optionally, the first type of adjusting particles 1012*a* consist of the second sub-type of adjusting particles and/or the first sub-type of adjusting particles. More optionally, the first type of adjusting particles 1012*a* consist of the second sub-type of adjusting particles.

Referring to FIG. 1, in some embodiments, the adjusting particles 1012 may consist of the first type of adjusting particles 1012*a*.

Referring to FIGS. 2 to 3, in some embodiments, the adjusting particles 1012 may include the second type of adjusting particles 1012*b* in order to improve both the chrominance visual angle and the contrast of the optical film 101 while reducing the rainbow strip problem of the optical film 101.

The second type of adjusting particle 1012*b* has a plurality of second cross sections, and each of the second cross sections has a second circumscribed circle. A ratio of a length of a long axis of the second type of adjusting particle 1012*b* to a diameter of the second circumscribed circle with a largest diameter among the plurality of second circumscribed circles is greater than or equal to 5. The ratio of the length of the long axis of the second type of adjusting particle 1012*b* to the diameter of the second circumscribed circle having the largest diameter among the plurality of second circumscribed circles is less than 100. The second cross section is perpendicular to the extension direction of the long axis of the second type of adjusting particle 1012*b*. For example, the ratio may be 10, 12, 15, 16, 18, 20, 30, 32, 34, 35, 36, 38, 40, 42, 45, 46, 48, 50, 52, 55, 56, 58, 60, 62, 65, 68, 70, 80, 90, etc. The diameter of the second circumscribed circle of one of the second cross sections of the second type of adjusting particle 1012*b* is the spacing between two points of this second cross section which are farthest from each other. By using the second type of adjusting particles 1012*b* each having a larger length-to-diameter ratio (i.e., a ratio of the length of the long axis to the diameter of the second circumscribed circle having the largest diameter), it is easier to change the direction of propagation of more light rays via the adjusting particles 1012, and it is advantageous to obtain an improved effect of the adjusting particles 1012 on the chrominance visual angle and the contrast while improving the rainbow strip.

The second-type adjusting particle 1012*b* has a slightly weaker improvement effect on reducing the difference between the in-plane retardation value of the optical film 101 and the thickness-direction retardation value of the optical film 101, compared with the first-type adjusting particle 1012*a*. And, fewer second-type adjusting particles 1012*b* have a significant improvement effect on the chrominance visual angle of the optical film 101. Thus, the mass fraction of the second type of adjusting particles 1012*b* in the adjusting particles 1012 is less than the mass fraction of the first type of adjusting particles 1012*a* in the adjusting particles 1012. For example, the mass fraction of the first type of adjusting particles 1012*a* in the adjusting particles 1012 is greater than 50%, and the mass fraction of the second type of adjusting particles 1012*b* in the adjusting particles 1012 is less than 50%. The mass fraction of the first type of adjusting particles 1012*a* in the adjusting particles 1012 may be 55%, 60%, 65%, 70%, 75%, 80%, 85%, 90%, 95%, 99%, etc.

In some embodiments, the second type of adjusting particle 1012*b* includes at least one type selected from a sixth sub-type of adjusting particle, a seventh sub-type of adjusting particle, an eighth sub-type of adjusting particle, a ninth sub-type of adjusting particle, and a tenth sub-type of adjusting particle that differ in shape from each other.

The variation value of diameters of the second circumscribed circles of the second cross sections of the sixth sub-type of adjusting particle is less than or equal to 0.3 μm along the extension direction of the long axis of the sixth sub-type of adjusting particle, and for example, may be 0

μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In some embodiments, the diameters of the second circumscribed circles of the second cross sections of the first portion of the sixth sub-type adjusting particle are the same as the diameters of the second circumscribed circles of the second cross sections of the middle portion of the sixth sub-type adjustment-adjusting particle, and the diameters of the second circumscribed circles of the second portion of the sixth sub-type adjusting particle are the same as the diameters of the second circumscribed circles of the middle portion of the sixth sub-type adjusting particle.

In some embodiments, the second cross section of the sixth sub-type of adjusting particle may be a regular shape or a random shape such as a circle, an ellipse, a triangle, a quadrilateral, or the like.

In some embodiments, the sixth sub-type of adjusting particles may be rod-shaped particles. When the sixth sub-type of adjusting particle is rod-shaped, second cross sections of the sixth sub-type of adjusting particle are circular or elliptical. Second circumscribed circles of the second cross sections of the sixth sub-type of adjusting particle may coincide with these second cross sections when the second cross sections of the sixth sub-type of adjusting particle are circular. When the second cross sections of the sixth sub-type adjusting particle are elliptical, a diameter of a second circumscribed circle of each of the second cross sections of the sixth sub-type adjusting particle is a length of a long axis of an elliptical shape of this second cross section of the sixth sub-type adjusting particle. And, a ratio of the long axis of an elliptical shape of one second cross section of one of the sixth sub-type adjusting particles to the minor axis of this elliptical shape is greater than 1 and less than or equal to 3, and for example, may be 1.2, 1.5, 1.8, 2, 2.2, 2.5, 2.8, or the like.

The variation value of diameters of the second circumscribed circles of the second cross sections of the middle portion of the seventh sub-type of adjusting particle along the extension direction of the long axis of the seventh sub-type of adjusting particle is less than or equal to 1 μm, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. The diameters of the second circumscribed circles of the second cross sections of the first portion of the seventh sub-type of adjusting particle are gradually reduced in a direction away from the middle portion of the seventh sub-type of adjusting particle. The variation value of the diameters of the second portion of the seventh sub-type of adjusting particle is less than or equal to 1 μm, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. In some embodiments, the diameters of the second circumscribed circles of the second cross sections of the first portion of the seventh sub-type of adjusting particle gradually decrease in a direction away from the middle portion of the seventh sub-type of adjusting particle, and the diameters of the second circumscribed circles of the second cross sections of the second portion of the seventh sub-type of adjusting particle are the same as the diameters of the second circumscribed circles of the second cross sections of the middle portion of the seventh sub-type of adjusting particle.

It will be appreciated that the diameters of the second circumscribed circles of the second cross sections of the first portion of the seventh sub-type of adjusting particle decrease gradually in a direction away from the middle portion of the seventh sub-type of adjusting particle, which indicates a tendency of the diameters of the second circumscribed circles of the second cross sections of the first portion of the seventh sub-type of adjusting particle to decrease in a direction away from the middle portion of the seventh sub-type of adjusting particle. The tendency includes, but not limited to, the diameters of the second circumscribed circles of the second cross sections of the first portion of the seventh sub-type of adjusting particle are decreased sequentially.

In some embodiments, the second cross section of the seventh sub-type of adjusting particle may have a regular shape or a random shape, such as a circle, an ellipse, a triangle, a quadrilateral, or the like.

In some embodiments, the seventh sub-type of adjusting particles may be acicular particles each having a reduced diameter at one end thereof.

In some embodiments, when the seventh sub-type of adjusting particles are acicular particles each having a reduced diameter at one end thereof, the second cross sections of the seventh sub-type of adjusting particles may be circular or elliptical. When the second cross sections of the second portion of the seventh sub-type of adjusting particle or the second cross sections of the middle portion of the seventh sub-type of adjusting particle are elliptical, the ratio of the long axis of an elliptical shape of any of the second cross sections of the second portion or the middle portion of the seventh sub-type of adjusting particle to the minor axis of this elliptical shape is greater than 1 and less than or equal to 3, and for example, may be 1.2, 1.5, 1.8, 2, 2.2, 2.5, 2.8, etc. The shapes of the second cross sections of the first portion of the seventh sub-type adjusting particle coincide with the shapes of the second cross sections of the middle portion of the seventh sub-type adjusting particle, and the area gradually decreases in a direction away from the middle portion of the seventh sub-type adjusting particle.

The variation value of the diameters of the second circumscribed circles of the second cross sections of the middle portion of the eighth sub-type of adjusting particle is less than or equal to 1 μm along the direction of the long axis of the eighth sub-type of adjusting particle, and for example, may be 0 μm, 0.95 μm, 0.8 μm, 0.78 μm, 0.75 μm, 0.72 μm, 0.7 μm, 0.68 μm, 0.65 μm, 0.62 μm, 0.6 μm, 0.58 μm, 0.55 μm, 0.52 μm, 0.5 μm, 0.48 μm, 0.45 μm, 0.42 μm, 0.4 μm, 0.38 μm, 0.35 μm, 0.32 μm, 0.3 μm, 0.28 μm, 0.25 μm, 0.22 μm, 0.2 μm, 0.18 μm, 0.15 μm, 0.12 μm, 0.1 μm, 0.08 μm, 0.05 μm, 0.02 μm, etc. The diameters of the second circumscribed circles of the second cross sections of the first portion of the eighth sub-type adjusting particle gradually decrease in a direction away from the middle portion of the eighth sub-type adjusting particle, and the diameters of the second circumscribed circles of the second cross sections of the second portion of the eighth sub-type adjusting particle gradually decrease. In some embodiments, the diameters of the second circumscribed circles of the second cross sections of the middle portion of the eighth sub-type of adjusting particle are uniform along the extension direction of the long axis of the eighth sub-type of adjusting particle, and the diameters of the second circumscribed circles of the second cross sections of the first portion and the second portion of the eighth sub-type of adjusting particle gradually change.

It will be appreciated that the diameters of the second circumscribed circles of the second cross sections of the first portion of the eighth sub-type of adjusting particle decrease gradually in a direction away from the middle portion of the eighth sub-type of adjusting particle, which indicates a tendency for the diameters of the second circumscribed circles of the second cross sections of the first portion of the eighth sub-type of adjusting particle to decrease in a direction away from the middle portion of the eighth sub-type of adjusting particle. The tendency includes, but not limited to, the diameters of the second circumscribed circles of the second cross sections of the first portion of the eighth sub-type of adjusting particle are decreased sequentially in a direction away from the middle portion of the eighth sub-type of adjusting particle.

It will be appreciated that the diameters of the second circumscribed circles of the second cross sections of the second portion of the eighth sub-type of adjusting particle decrease gradually in a direction away from the middle portion of the eighth sub-type of adjusting particle, which indicates the tendency of the diameters of the second circumscribed circles of the second cross sections of the second portion of the eighth sub-type of adjusting particle tends to decrease in a direction away from the middle portion of the eighth sub-type of adjusting particle. The tendency, includes but not limited to, in a direction away from the middle portion of the eighth sub-type of adjusting particles, the diameters of the second circumscribed circles of the second cross sections of the second portion of the eighth sub-type of adjusting particle sequentially decrease.

In some embodiments, the second cross section of the eighth sub-type of adjusting particle may be a regular shape or a random shape such as a circle, an ellipse, a triangle, a quadrilateral, or the like.

In some embodiments, the eighth sub-type of adjusting particles may be acicular particles each having a reduced diameter at both ends thereof.

In some embodiments, when the eighth sub-type of adjusting particles are acicular particles each having a reduced diameter at both ends thereof, the shapes of the second cross sections of the eighth sub-type of adjusting particle may be circular or elliptical. When the second cross sections of the middle portion of the eighth sub-type of adjusting particle are elliptical, the long axis of the elliptical shape of any of the second cross sections of the middle portion of the eighth sub-type of adjusting particle to the minor axis of this elliptical shape is greater than 1 and less than or equal to 3, and for example, may be 1.2, 1.5, 1.8, 2, 2.2, 2.5, 2.8, etc. The shapes of the second cross sections of both the first portion and the second portion of the eighth sub-type adjusting particle coincide with the shapes of the second cross sections of the middle portion of the eighth sub-type adjusting particle, and the area gradually decreases in a direction away from the middle portion of the eighth sub-type adjusting particle.

A first portion and a second portion of the ninth sub-type adjusting particle are connected to each other, and diameters of second circumscribed circles of the second cross sections of the ninth sub-type adjusting particle gradually decrease along a direction from the first portion of the ninth sub-type adjusting particle to the second portion of the ninth sub-type adjusting particle.

It will be appreciated that the diameters of the second circumscribed circles of the second cross sections of the ninth sub-type adjusting particle decrease gradually along the direction from the second portion of the ninth sub-type adjusting particle to the second portion of the ninth sub-type adjusting particle, which indicates a tendency of the diameters of the second circumscribed circles of the second cross sections of the ninth sub-type adjusting particle to decrease in the direction from the first portion from the ninth sub-type adjusting particle to the second portion of the ninth sub-type adjusting particle. The tendency includes, but not limited to, the diameters of the second circumscribed circles of the second cross sections of the ninth sub-type adjusting particle sequentially decrease in the direction from the first portion of the ninth sub-type adjusting particle to the second portion of the ninth sub-type adjusting particle.

In some embodiments, the second cross section of the ninth sub-type of adjusting particle may have a regular shape or a random shape, such as a circle, an ellipse, a triangle, a quadrangle, or the like.

In some embodiments, the ninth sub-type of adjusting particles may be long cone-shaped particles.

In some embodiments, when the ninth sub-type of adjusting particles are long cone-shaped particles, the second cross sections of the ninth sub-type of adjusting particles are circular or elliptical. The shapes of the second cross sections of the ninth sub-type adjusting particle are consistent and the area is gradually reduced along the direction from the first portion of the ninth sub-type adjusting particle to the second portion of the ninth sub-type adjusting particle. When the second cross sections of the ninth sub-type of adjusting particle are elliptical, the ratio of the long axis of an elliptical shape of any of the second cross sections of the ninth sub-type of adjusting particle to the minor axis of this elliptical shape is greater than 1 and less than or equal to 3, and for example, can be 1.2, 1.5, 1.8, 2, 2.2, 2.5, 2.8, etc.

A first portion and a second portion of the tenth sub-type adjusting particle are connected to each other. Diameters of second circumscribed circles of the second cross sections of the first portion of the tenth sub-type adjusting particle gradually decrease in a direction away from the second portion of the tenth sub-type adjusting particle, and diameters of second circumscribed circles of the second cross sections of the second portion of the tenth sub-type adjusting particle gradually decrease in a direction away from the first portion of the tenth sub-type adjusting particle.

It will be appreciated that the diameters of the second circumscribed circles of the second cross sections of the first portion of the tenth sub-type adjusting particle decrease gradually in a direction away from the second portion of the tenth sub-type adjusting particle, which indicates a tendency of the diameters of the second circumscribed circles of the second cross sections of the first portion of the tenth sub-type adjusting particle to decrease in a direction away from the second portion of the tenth sub-type adjusting particle. The tendency includes, but not limited to, the diameters of the second circumscribed circles of the second cross sections of the first portion of the tenth sub-type adjusting particle decrease in sequence in a direction away from the second portion of the tenth sub-type adjusting particle.

It will be appreciated that the diameters of the second circumscribed circles of the second cross sections of the second portion of the tenth sub-type adjusting particle decrease gradually in a direction away from the first portion of the tenth sub-type adjusting particle, which indicates a tendency of the diameters of the second circumscribed circles of the second cross sections of the second portion of the tenth sub-type adjusting particle to decrease in a direction away from the first portion of the tenth sub-type adjusting particle. The tendency includes, but not limited to, the diameters of the second circumscribed circles of the second cross sections of the second portion of the tenth sub-type adjusting particle decrease in sequence in a direction away from the first portion of the tenth sub-type adjusting particle.

In some embodiments, the second cross section of the tenth sub-type of adjusting particles may each have a regular shape or a random shape, such as a circle, an ellipse, a triangle, a quadrilateral, or the like.

In some embodiments, the tenth sub-type of adjusting particles may be bipyramidal particles and/or ellipsoidal particles.

In some embodiments, when the tenth sub-type of adjusting particles are bipyramidal particles and/or ellipsoidal particles, the second cross sections of the tenth sub-type of adjusting particles are circular or ellipsoidal. In a direction away from the second portion of the tenth sub-type adjusting particle, the shapes of the second cross sections of the first portion of the tenth sub-type adjusting particle are uniform and the area is gradually reduced. The shapes of the second cross sections of the second portion of the tenth sub-type adjusting particle are consistent and the area is gradually reduced in a direction away from the first portion of the tenth sub-type adjusting particle. When the second cross sections of the tenth sub-type of adjusting particle are elliptical, a ratio of a long axis of an elliptical shape of any of the second cross sections of the tenth sub-type of adjusting particle to a minor axis of this elliptical shape is greater than 1 and less than or equal to 3, and for example, may be 1.2, 1.5, 1.8, 2, 2.2, 2.5, 2.8, etc.

The tenth sub-type adjusting particle that is bipyramidal particle is different from the tenth sub-type adjusting particle that is an ellipsoidal particle in that: when the tenth sub-type adjusting particle is a bipyramidal particle, a cross section of the tenth sub-type adjusting particle in a direction parallel to a long axis of the tenth sub-type adjusting particle is a polygon such as a triangle or a quadrilateral; when the tenth sub-type adjusting particle is an ellipsoidal particle, a cross section of the tenth sub-type adjusting particle in the direction parallel to the long axis of the tenth sub-type adjusting particle is elliptical.

In some embodiments, the length of the long axis of the second type of adjusting particle **1012*b* is greater than or equal to 1 μm, the length of the long axis of this second type of adjusting particle 1012*b* is less than or equal to 200 μm, and for example, may be 5 μm, 10 μm, 50 μm, 60 μm, 70 μm, 80 μm, 90 μm, 100 μm, 120 μm, 150 μm, 180 μm, etc., in order to effectively enhance the chrominance visual angle of the optical film 101 while reducing rainbow strip problems of the optical film 101. Optionally, the length of the long axis of the second type of adjusting particle 1012*b* is greater than or equal to 40 μm, and the length of the long axis of the second type of adjusting particle 1012*b* is less than or equal to 100 μm. In this way, the size of the second type of adjusting particle 1012*b* is more concentrated, thereby facilitating further comprehensive improvement of the optical performance of the optical film 101**.

In some embodiments, when the adjusting particles 1012 include the first type of adjusting particles **1012*a* and the second type of adjusting particles 1012*b*, the mass fraction of the second sub-type of adjusting particles in the adjusting particles 1012 is greater than the mass fraction of the first sub-type of adjusting particles in the adjusting particles 1012, and the mass fraction of the first sub-type of adjusting particles in the adjusting particles 1012 is greater than or equal to the mass fraction of the second sub-type of adjusting particles 1012*b* in the adjusting particles 1012**.

In some embodiments, the mass fraction of the first sub-type of adjusting particles in the adjusting particles 1012 is greater than or equal to 50%, and, e.g., may be 55%, 60%, 70%, 75%, 80%, 85%, 90%, 95%, 99%, 100%, etc. The mass fraction of the second sub-type of adjusting particles in the adjusting particles 1012 is less than or equal to 25%, and for example, may be 20%, 15%, 10%, 5%, 3%, 1%, 0%, etc. The mass fraction of the second type of adjusting particles **1012*b* in the adjusting particles 1012** is less than or equal to 25%, and for example, may be 20%, 15%, 10%, 5%, 3%, 1%, 0%, etc.

In some embodiments, the second type of adjusting particles **1012*b* include at least two selected from the sixth sub-type of adjusting particle, the seventh sub-type of adjusting particle, the eighth sub-type of adjusting particle, the ninth sub-type of adjusting particle, and the tenth sub-type of adjusting particle. Optionally, the second type of adjusting particles 1012*b* are a mixture of the sixth sub-type adjusting particle, the seventh sub-type adjusting particle, and the eighth sub-type adjusting particle. Or, the second type of adjusting particles 1012*b* are a mixture of the sixth sub-type adjusting particle, the ninth sub-type adjusting particle, and the tenth sub-type adjusting particle. Or, the second type of adjusting particles 1012*b* are a mixture of the sixth sub-type adjusting particle, the seventh sub-type adjusting particle, the eighth sub-type adjusting particle, the ninth sub-type adjusting particle, and the tenth sub-type adjusting particle. By selecting the second type of adjusting particles 1012*b* to include particles with at least two different shapes, the diversity of the shapes of the second type of adjusting particles 1012*b* is increased, and the optical anisotropy of the second type of adjusting particles 1012*b* is increased, so the enhancement effect of the second type of adjusting particles 1012*b* on contrast and brightness is improved. When the second type of adjusting particle 1012*b* is selected from one of a sixth sub-type of adjusting particle, a seventh sub-type of adjusting particle, and an eighth sub-type of adjusting particle, or, when the second type of adjusting particle 1012*b* is selected from one of the sixth sub-type of adjusting particle, a ninth sub-type of adjusting particle, and a tenth sub-type of adjusting particle, or, when the second type of adjusting particles 1012*b* are a mixture of the sixth sub-type of adjusting particles, the seventh sub-type of adjusting particles, the eighth sub-type of adjusting particles, the ninth sub-type of adjusting particles and the tenth sub-type of adjusting particles, the mass fraction of the sixth sub-type of adjusting particles in the second type of adjusting particles 1012*b* is 1% to 8%. The mass fraction may be 1.5%, 2%, 2.5%, 3%, 3.5%, 4%, 4.5%, 5%, 6%, 6.5%, 7%, 7.5%, and the like. The mass fraction of the seventh sub-type of adjusting particles and/or the ninth sub-type of adjusting particles in the second type of adjusting particles 1012*b* is 40% to 50%, respectively, and for example, may be 41%, 42%, 43%, 44%, 45%, 46%, 47%, 48%, 49%, etc. The mass fraction of the eighth sub-type of adjusting particles and/or the tenth sub-type of adjusting particles in the second type of adjusting particles 1012*b* is 45% to 55%, respectively, and for example, may be 46%, 47%, 48%, 49%, 50%, 51%, 52%, 53%, 54%, etc. The mixing of the sixth sub-type adjusting particles, the seventh sub-type adjusting particles and/or the ninth sub-type adjusting particles, the eighth sub-type adjusting particles and/or the tenth sub-type adjusting particles based on the above ratios helps to further improve the enhancement effect of the obtained adjusting particles 1012** on contrast and brightness.

In some embodiments, the mass fraction of the adjusting particles 1012 in the optical film 101 is less than or equal to 20%, and for example, may be 0.0001%, 0.001%, 0.01%, 0.02%, 0.05%, 0.1%, 0.5%, 1%, 5%, 8%, 10%, 12%, 15%, 18%, etc., so as to be uniformly dispersed in the optical film 101. In this way, it is effective to improve the rainbow strip problem of the optical film 101 in the large angle direction, thereby improving the display quality of the display device having the optical film 101. The adjusting particles 1012 have a small mass fraction in the optical film 101, so that the rainbow strip in the large-angle direction of the optical film 101 can be effectively reduced, and the smaller the mass fraction, the better the dispersibility. Optionally, the mass fraction of the adjusting particles 1012 in the optical film 101 is less than or equal to 10%. More optionally, the mass fraction of the adjusting particles 1012 in the optical film 101 is less than or equal to 5%. Further optionally, the mass fraction of the adjusting particles 1012 in the optical film 101 is less than or equal to 1%. Still further optionally, the mass fraction of the adjusting particles 1012 in the optical film 101 is less than or equal to 0.05%. Meanwhile, in order to ensure that the number of the adjusting particles 1012 in the optical film 101 is sufficient to effectively improve the rainbow strip of the optical film 101 in the large angle direction, the mass fraction of the adjusting particles 1012 in the optical film 101 may be greater than or equal to 0.001%, preferably greater than or equal to 0.003%, more preferably greater than or equal to 0.005%, further preferably greater than or equal to 0.015%, and further preferably greater than or equal to 0.03%.

In some embodiments, the second type of adjusting particles 1012*b* are whiskers. The material of the first type of adjusting particles 1012*a* and the material of the second type of adjusting particles 1012*b* are selected from at least one of silicon dioxide, silicon carbide, silicon nitride, zinc oxide, magnesium oxide, aluminum oxide, calcium sulfate, calcium carbonate, potassium titanate, or aluminum salt.

In some embodiments, the second type of adjusting particles 1012*b* and/or the first type of adjusting particles 1012*a* may be surface modified to facilitate dispersion of the second type of adjusting particles 1012*b* and/or the first type of adjusting particles 1012*a* in the base material 1011, or to enhance functionality such as toughness of the second type of adjusting particles 1012*b* and/or the first type of adjusting particles 1012*a*. When the second type of adjusting particles 1012*b* and/or the first type of adjusting particles 1012*a* are surface modified, the surfaces of the second type of adjusting particles 1012*b* and/or the first type of adjusting particles 1012*a* are modified via at least one of an inorganic cation, an inorganic anion, a polymer, a coupling agent, or a surfactant. That is, the surfaces of the second type of adjusting particles 1012*b* and/or the first type of adjusting particles 1012*a* include at least one of an inorganic cationic group, an inorganic anionic group, a polymeric group, a coupling agent group, or a surfactant group.

Specifically, the surfaces of the second type of adjusting particles 1012*b* and/or the first type of adjusting particles 1012*a* are modified via at least one type selected from the group consisting of magnesium chloride, calcium chloride, barium chloride, strontium chloride, stearic acid, sodium stearate, zinc stearate, sulfonic acid-based surfactants, thio-based surfactants, titanates, aluminates, polyacrylamides, silanes, alkyl phosphates, aryl phosphates, alkyl phosphates, aryl phosphates, alkyl alcohol amide phosphates, alkyl alcohol amide phosphates, imidazoline phosphates, imidazoline phosphates, high polyphosphates, high polyphosphates, and siloxane phosphates. Optionally, the surfaces of the second type of adjusting particles 1012*b* and/or the first type of adjusting particles 1012*a* are modified by at least one of a sulfonic acid-based surfactant or a thio-based surfactant. The sulfonic acid-based surfactant may be selected from at least one of alkyl sulfonates or fluoroalkyl sulfonates; and specifically, for example, from at least one of sodium dodecyl sulfonate, sodium dodecyl benzene sulfonate or sodium fluorododecyl sulfonate. The thio-based surfactant may be selected from at least one of a thiol or a fluorothiol, and specifically, from at least one of 1-mercaptooctane, dodecanethiol, 1-tetradecanethiol, octadecanethiol, fluorooctadecanethiol, or fluorododecanethiol. When the sulfonic acid-based surfactant is mixed with the adjusting particles 1012 to be surface-modified, the sulfonic acid-based surfactant groups form a sulfonic acid-based shell layer on the surface of the whisker, such as a benzene ring sulfonic acid-based shell layer, which is favorable for protecting the adjusting particles 1012. In this way, the toughness of the adjusting particles 1012 is enhanced, and the breakage of the second-type adjusting particles 1012*b* and/or the first-type adjusting particles 1012*a* in the optical film 101 is reduced. When the thio-based surface-active group is mixed with the adjusting particles 1012 to be surface-modified, the thio-based surfactant group forms a cross-linked network of O—S—O with hydroxyl groups on the surface of the whisker, and the bond energy of O—S—O is relatively large, which facilitates protection of the second-type adjusting particles 1012*b* and/or the first-type adjusting particles 1012*a* during the mixing of the second-type adjusting particles 1012*b* and/or the first-type adjusting particles 1012*a* with the material of the base material 1011 to form the optical film 101. In this way, breakage of the second-type adjusting particles 1012*b* and/or the first-type adjusting particles 1012*a* is reduced, and the effect of the second-type adjusting particles 1012*b* and/or the first-type adjusting particles 1012*a* on optical functions such as contrast and brightness is improved. More optionally, in the second type of adjusting particles 1012*b* and/or the first type of adjusting particles 1012*a*, the fluorine atom has a high stability in the alkyl chain, via at least one of a sulfonic acid-based surfactant containing a fluorine substituent, a thio-based surfactant containing a fluorine substituent, and specifically, for example, via at least one of a sodium fluorododecyl sulfonate, a fluorooctyl thiol, or a fluorododecyl thiol. In this way, the bond energy of the carbon-fluorine bond is higher than the bond energy of the carbon-carbon bond, the carbon-fluorine bond has a shielding effect on the carbon-carbon bond, so that the protection of the carbon-carbon bond is facilitated, thereby enhancing the stability of the second type of adjusting particles 1012*b* and/or the first type of adjusting particles 1012*a*.

In some embodiments, the difference between the refractive index of the base material 1011 and the refractive index of the adjusting particles 1012 is greater than or equal to 0.02, and for example, may be 0.03, 0.05, 0.09, 0.1, 0.15, 0.2, etc. So, the adjusting particles 1012 achieve a light diffusion function while improving the rainbow strip problem of the optical film 101, thereby further improving the optical performance of the optical film 101. Optionally, the difference between the refractive index of the base material 1011 and the refractive index of the adjusting particles 1012 is 0.1 or more, and for example, may be 0.12, 0.13, 0.14, 0.15, 0.2, or the like.

In some embodiments, the base material 1011 has a glass transition temperature of 70° C. to 600° C., and for example, may be 80° C., 90° C., 100° C., 150° C., 200° C., 250° C., 300° C., 350° C., 400° C., 450° C., 500° C., 550° C., and the like.

In some embodiments, the base material 1011 has an elastic modulus of 500 MPa to 5000 MPa at 23° C., and for example, may be 600 MPa, 700 MPa, 800 MPa, 900 MPa, 1000 MPa, 1200 MPa, 1500 MPa, 1800 MPa, 2000 MPa, 2200 MPa, 2500 MPa, 2800 MPa, 3000 MPa, 3200 MPa, 3500 MPa, 3800 MPa, 4000 MPa, 4200 MPa, 4500 MPa, 4800 MPa, and the like.

In some embodiments, the elastic modulus of the base material 1011 may be obtained in a humidity of 50%.

In some embodiments, the thickness of the optical film 101 is greater than or equal to 5 μm, and the thickness of the optical film 101 is less than or equal to 500 μm. For example, this thickness may be 10 μm, 50 μm, 60 μm, 100 μm, 150 μm, 200 μm, 250 μm, 300 μm, 350 μm, 400 μm, 450 μm, etc., so as to facilitate to process the optical film 101 to obtain and maintain appropriate light transmittance of the optical film 101. Optionally, the thickness of the light diffusion film is greater than or equal to 15 μm, and the thickness of the light diffusion film is less than or equal to 150 μm. For example, this thickness may be 20 μm, 25 μm, 30 μm, 40 μm, 50 μm, 60 μm, 80 μm, 100 μm, 120 μm, 130 μm, 140 μm, and the like.

According to the optical film 101 provided in the embodiments of the present disclosure, the adjusting particles 1012 are added to the base material 1011 of the optical film 101 to reduce the difference between the in-plane retardation value and the thickness-direction retardation value of the optical film 101, thereby improving the rainbow strip problem caused by the optical film 101.

Referring to FIGS. 4 to 7, according to embodiments of the present disclosure, it is further provided a polarizer 100 including an optical film 101 as previously described.

The polarizer 100 further includes a polarizing layer 102 on one side of the optical film 101.

Referring to FIGS. 4-7, in some embodiments, the polarizer 100 further includes an optical functional layer 103 on at least one side of the base material 1011.

The optical functional layer 103 is located between the polarizing layer 102 and the optical film 101. Alternatively, the optical functional layer 103 is located on a side of the optical film 101 which is away from the polarizing layer 102.

In some embodiments, the optical functional layer 103 is located on the side of the optical film 101 which is away from the polarizing layer 102. The polarizer 100 further includes a first adhesive layer 104 located at one side of the optical film 101 which is adjacent to the polarizing layer 102.

The first adhesive layer 104 is in direct contact with the polarizing layer 102. Alternatively, the polarizer 100 further includes a protective layer 105 between the optical film 101 and the polarizing layer 102, and the first adhesive layer 104 is in direct contact with the protective layer 105.

In some embodiments, the first adhesive layer 104 is in direct contact with the optical film 101, and the first adhesive layer 104 is in direct contact with the polarizing layer 102. Alternatively, the first adhesive layer 104 is in direct contact with the optical film 101, and the first adhesive layer 104 is in direct contact with the protective layer 105.

In some embodiments, the first adhesive layer 104 may be selected from at least one of a water adhesive, a pressure sensitive adhesive, or an ultraviolet adhesive. The material of the water adhesive may be polyvinyl alcohol. The material of the pressure sensitive adhesive may be acrylate copolymers. The material of the ultraviolet adhesive may be multifunctional acrylate monomers.

Figure 4:
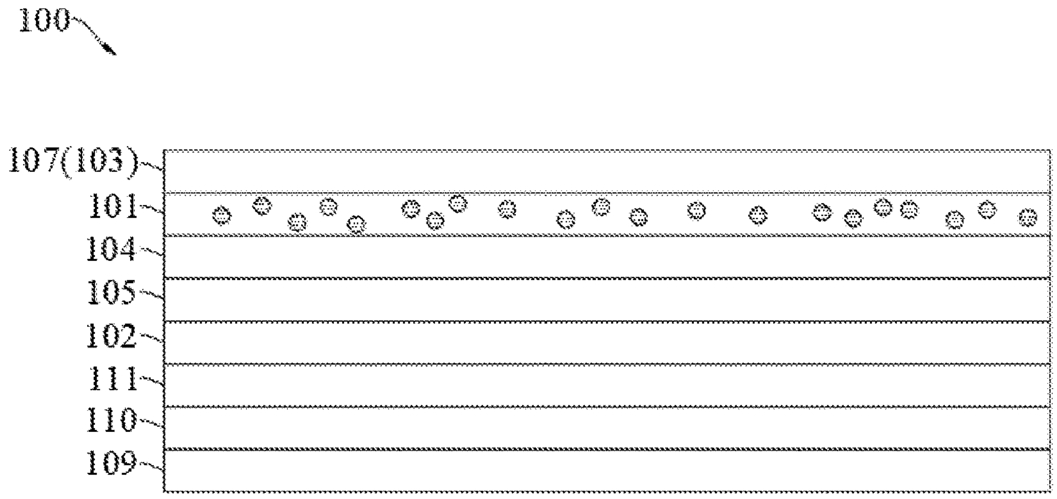
FIG. 4 is a first structural diagram of a polarizer according to some embodiments of the present disclosure.
Figure 5:
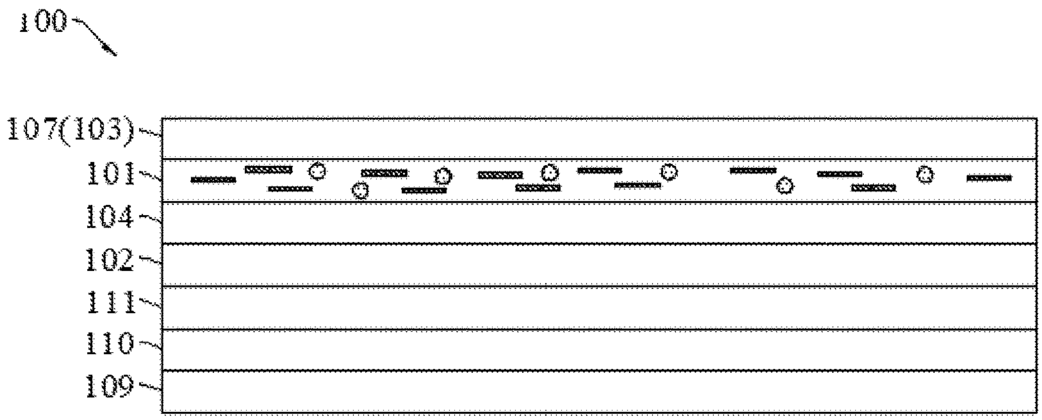
FIG. 5 is a second structural diagram of a polarizer according to some embodiments of the present disclosure.
Figure 6:
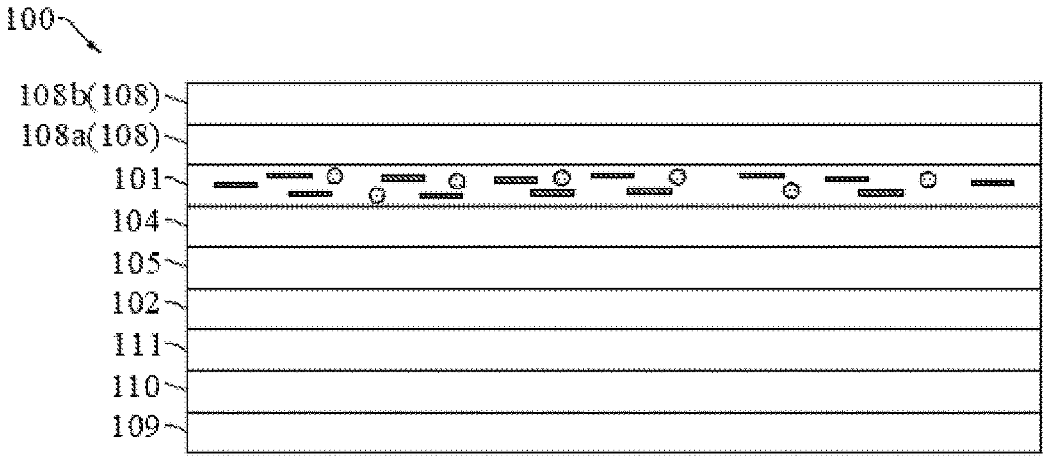
FIG. 6 is a third structural diagram of a polarizer according to some embodiments of the present disclosure.
Figure 7:
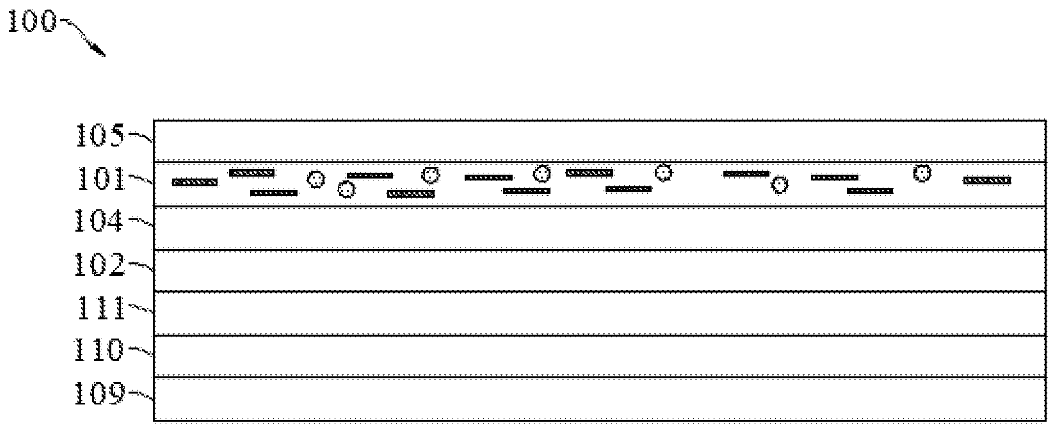
FIG. 7 is a fourth structural diagram of a polarizer according to some embodiments of the present disclosure.

Referring to FIGS. 4-6, in some embodiments, the optical functional layer 103 includes at least one of a transparent hardening sublayer 107, a low reflection sublayer 108, an anti-reflection sublayer, an anti-fingerprint sublayer, or an anti-static sublayer. When the optical functional layer 103 is a low reflection sublayer 108, the low reflection sublayer 108 may be formed by stacking a transparent hardened sub-portion 108*a* and a low-refraction sub-portion 108*b*.

In some embodiments, the polarizing layer 102 consists of polyvinyl alcohol and a dye.

In some embodiments, the polarizer 100 further includes a release layer 109 on a side of the polarizing layer 102 which is away from the optical film 101. The release layer 109 is bonded to the polarizing layer 102 by a second adhesive layer 110. After the polarizer 100 is applied to the display device, the release layer 109 is removed to expose the second adhesive layer 110, so that the polarizer 100 is adhered to the display panel through the second adhesive layer 110.

In some embodiments, the polarizer 100 further includes a compensation layer 111 between the second adhesive layer 110 and the polarizing layer 102.

With the arrangement of the optical film 101, in the embodiments of the present disclosure, optical defects such as moire patterns or white spots caused by the polarizer 100 are avoided, and the chrominance visual angle and the contrast of the display device to which the polarizer 100 is applied are improved.

Figure 8:
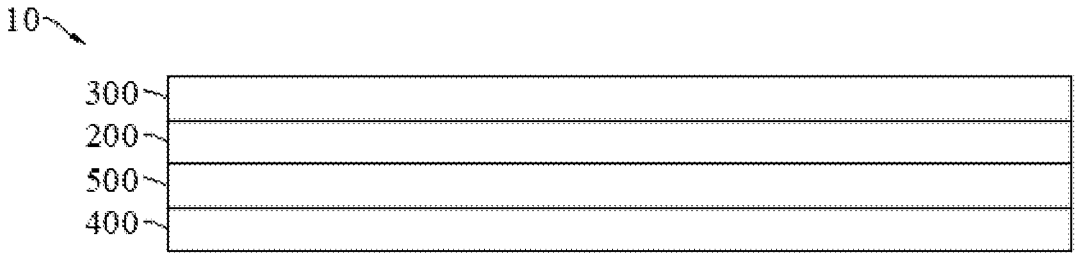
FIG. 8 is a structural diagram of a display device according to some embodiments of the present disclosure.

Referring to FIG. 8, according to some embodiments of the present disclosure, it is further provided a display device 10 including the polarizer 100 as previously described.

Specifically, the display device includes a display panel 200 and a first polarizer 300 located on a light output side of the display panel 200. The first polarizer 300 is the polarizer 100 described above.

In some embodiments, the display panel 200 may be a liquid crystal display panel, a spontaneous display panel, or the like. The spontaneous display panel may be an Organic Light-Emitting Diode (OLED) display panel, or the like.

In some embodiments, the optical film 101 in the first polarizer 300 is located on a side, which is away from the display panel, of the polarizer layer 102 of the first polarizer 300.

When the display panel 200 is a liquid crystal display panel, the display device 10 further includes a backlight module 400 located on a side of the display panel 200 which is away from the first polarizer 300. The backlight module 400 is used to provide a light source for the display panel 200. The display device 10 also includes a second polarizer 500 located between the backlight module 400 and the display panel 200. The second polarizer 500 may be the polarizer 100 as previously described, or the second polarizer 500 may not be the polarizer 100 as previously described.

Next, the present disclosure will be described in more detail with reference to some examples. It should be noted that, however, these examples are provided for purposes of illustration only and should not be construed as limiting the disclosure in any way.

Example 1

In this example, the material of the base material is unmodified polyethylene terephthalate, and the adjusting particles in the base material are spherical silica. The base material and the adjusting particles are mixed and then stretched (stretching ratio MD×TD is 5×3) in a Moving Direction (MD) and Transfer Direction (TD), so as to form the optical film 1 having a thickness of 60 μm. The mass fraction of the adjusting particles in the optical film 1 is 0.05%.

Example 2

This example is the same as or similar to Example 1, except that the mass fraction of adjusting particles in the formed optical film 2 is 0.1%.

Example 3

This example is the same as or similar to Example 1, except that the mass fraction of adjusting particles in the formed optical film 3 is 0.2%.

Example 4

This example is similar to Example 1, except that the mass fraction of adjusting particles in the formed optical film 4 is 0.5%.

Example 5

This example is similar to Example 1, except that the mass fraction of adjusting particles in the formed optical film 5 is 0.8%.

Example 6

This example is similar to Example 1, except that the mass fraction of adjusting particles in the formed optical film 6 is 1%.

Example 7

This example is similar to Example 4, except that the optical film 7 has a thickness of 55 μm.

Example 8

This example is similar to Example 4, except that the adjusting particles are rod-shaped silicon dioxide to form the optical film 8.

Example 9

This example is similar to Example 4, except that the adjusting particles are formed by mixing rod-shaped silicon dioxide, spherical silicon dioxide, and cubic silicon dioxide at a mass ratio of 2:6:2, so as to form the optical film 9.

Example 10

In this example, the material of the base material is unmodified polymethyl methacrylate, the adjusting particles in the base material are spherical polystyrene, and the base material and the adjusting particles are mixed to form the optical film 10 having a thickness of 40 μm. And, the mass fraction of the adjusting particles in the optical film 10 is 0.02%.

Example 11

This example is similar to Example 10, except that the adjusting particles are rod-shaped polystyrene to form the optical film 11, and the mass fraction of the adjusting particles in the optical film 11 is 0.05%.

Example 12

This example is similar to Example 10, except that the adjusting particles are formed by mixing rod-shaped polystyrene, spherical-shaped polystyrene, and cube-shaped polystyrene at a mass ratio of 2:6:2, so as to form the optical film 12. And, the mass fraction of the adjusting particles in the optical film 12 is 0.5%.

Example 13

In this example, the material of the base material is unmodified polycarbonate, the adjusting particles in the base material are spherical polystyrene, the base material and the adjusting particles are mixed to form an optical film 12 having a thickness of 50 μm, and the mass fraction of the adjusting particles in the optical film 13 is 0.2%.

Example 14

This example is similar to Example 13, except that the adjusting particles are rod-shaped polystyrene to form the optical film 14.

Example 15

This example is similar to Example 13, except that the adjusting particles are formed by mixing rod-shaped polystyrene, ball-shaped polystyrene, and cube-shaped polystyrene at a mass ratio of 2:6:2 to form the optical film 15.

Example 16

This example is similar to Example 11, except that the base material is mixed with the adjusting particles to form an optical film 16 having a thickness of 80 μm, and the mass fraction of the adjusting particles in the optical film 16 is 0.03%.

Example 17

This example is similar to Example 16, except that the mass fraction of the adjusting particles in the optical film 17 is 0.015%.

Example 18

This example is similar to Example 16, except that the mass fraction of adjusting particles in the optical film 18 is 0.005%.

Example 19

This example is similar to Example 16, except that the mass fraction of the adjusting particles in the optical film 19 is 0.003%.

Example 20

This example is similar to example 16, except that the mass fraction of adjusting particles in the optical film 20 is 0.001%.

Comparative Example 1

This comparative example is similar to Example 1, except that there are no adjusting particles to form the comparative optical film 1.

The optical films obtained in Examples 1 to 15, and the comparative optical films obtained in comparative example 1 have in-plane retardation values via an Optipro-micro phase delay measuring instrument of shintech Corporation. The results are shown in Table 1.

The light diffusion film obtained in Examples 1 to 15 and the comparative optical film obtained in Comparative Example 1 were disposed on one side of the polarizer which are away from the display panel respectively, and the polarizer was attached to the surface of the 75-inch liquid crystal display panel for rainbow strip observation from the front and the sides. The results are shown in Table 1. The observation result may be "visible rainbow strip", "faint rainbow strip", "slight rainbow strip", and "un-conspicuous rainbow strip", which indicates that the observed rainbow strips are obviously decreased sequentially in terms of visibility. And, "no rainbow strip" may indicate that the rainbow strip phenomenon is not observed. The polarizer to be tested includes a compensation layer, a polarizing layer, a protective layer, a light diffusion film (or a comparative optical film), and a transparent hardening sub-layer, which are arranged in sequence by lamination.

The light diffusion films obtained in Example 4 and Example 8 were respectively disposed on one side of the polarizer which is away from the display panel, and the polarizer was attached to the surface of the 75-inch liquid crystal display panel, so as to perform further optical effect testing. The results are shown in Table 2. The polarizer to be tested includes a compensation layer, a polarizing layer, a protective layer, a light diffusion film (or a comparative optical film), and a transparent hardening sub-layer, which are arranged in sequence by lamination.

The luminance visual angle is a value of a corresponding side visual angle when the side visual angle luminance is half of a front visual angle luminance.

The chrominance visual angle measurement is a visual angle measurement performed by the CESI0.03.

The above-mentioned Table 1 and Table 2 are as follows.

TABLE 1

| | in-plane retardation value (nm) | Rainbow strip |
|---|---|---|
| Optical film 1 | 14 | No rainbow strip |
| Optical film 2 | 17 | No rainbow strip |
| Optical film 3 | 6 | No rainbow strip |
| Optical film 4 | 52 | No rainbow strip |
| Optical film 5 | 120 | No rainbow strip |
| Optical film 6 | 8 | No rainbow strip |
| Optical film 7 | 21 | No rainbow strip |
| Optical film 8 | 95 | No rainbow strip |
| Optical film 9 | 65 | No rainbow strip |
| Optical film 10 | 3 | No rainbow strip |
| Optical film 11 | 20 | No rainbow strip |
| Optical film 12 | 5 | No rainbow strip |
| Optical film 13 | 4 | No rainbow strip |
| Optical film 14 | 15 | No rainbow strip |
| Optical film 15 | 11 | No rainbow strip |
| Optical film 16 | 200 | No rainbow strip |
| Optical film 17 | 500 | Un-conspicuous rainbow strip |
| Optical film 18 | 700 | Slight rainbow strip |
| Optical film 19 | 1000 | Slight rainbow strip |
| Optical film 20 | 1375 | Faint rainbow strip |
| Comparative optical film 1 | 3000 | Visible rainbow strip |

TABLE 2

| | Luminance visual angle (°) | Chrominance visual angle (°) |
|---|---|---|
| Optical film 4 | 72 | 93 |
| Optical film 8 | 74 | 112 |

As can be seen from Table 1, by adding adjusting particles in the optical film, the in-plane retardation value of the optical film is effectively reduced, and the rainbow strip problem is improved or even eliminated. At the same time, in terms of reducing the in-plane retardation value of the optical film, the spherical particles have the best effect of reducing the in-plane retardation value of the optical film, the adjustment particles composed of a mixture of various shapes of particles have the second effect of reducing the in-plane retardation value of the optical film, and the rod-shaped particles have the third effect of reducing the in-plane retardation value of the optical film. Further, when the in-plane retardation value is reduced to 1000 nm or less, the improvement of the rainbow strip of the optical film is more obvious. When the in-plane retardation value is less than or equal to 200 nm, the rainbow strip of the optical film is completely eliminated. As can be seen from Table 2, the rod-shaped particles are better than the spherical particles in terms of adjusting the chrominance visual angle and the luminance visual angle of the optical film.

According to some embodiments of the present disclosure, it is provided an optical film, a polarizer, and a display device, in which the optical film includes a base material and adjusting particles dispersed in the base material. The optical film has an in-plane retardation value, and the in-plane retardation value of the optical film is less than 3000 nm. The present disclosure reduces the in-plane retardation value of the optical film to less than 3000 nm by adding adjusting particles to the base material of the optical film. In this way, the difference between the in-plane retardation value of the optical film and the thickness-direction retardation value of the optical film is reduced, thereby improving the rainbow strip problem caused by the optical film.

An optical film, a polarizer, and a display device according to embodiments of the present disclosure are described above in detail, and the principles and embodiments of the present disclosure are described herein by using specific examples. The above descriptions of the embodiments are merely intended to help understand the method of the present disclosure and the core idea thereof. At the same time, variations in the detailed description and the scope of the application will occur to those skilled in the art in accordance with the teachings of the present disclosure. In light of the foregoing, the present specification is not to be construed as limiting the disclosure.

What is claimed is:

1. An optical film comprising:

a base material; and adjusting particles dispersed within the base material;

wherein the optical film has an in-plane retardation value, and the in-plane retardation value of the optical film is less than 3000 nm;

wherein the adjusting particles comprise a first type of adjusting particles, for each of the first type of adjusting particles, the first type of adjusting particle has a plurality of first cross sections having respective first circumscribed circles, a ratio of a length of a long axis of the first type of adjusting particle to a diameter of one of the first circumscribed circles which has a largest diameter is greater than or equal to 5 and less than 10, and the ratio of the length of the long axis of the first type of adjusting particle to the diameter of the one of the first circumscribed circles which has the largest diameter is greater than 10 and less than or equal to 50;

wherein the length of the long axis of the first type of adjusting particle is greater than or equal to 1 μm, and less than or equal to 200 μm.

2. The optical film according to claim 1, wherein the in-plane retardation value of the optical film is less than or equal to 1000 nm.

3. The optical film according to claim 2, wherein the in-plane retardation value of the optical film is less than or equal to 500 nm.

4. The optical film according to claim 3, wherein the in-plane retardation value of the optical film is less than or equal to 200 nm.

5. The optical film according to claim 1, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

6. The optical film according to claim 2, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

7. The optical film according to claim 3, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

8. The optical film according to claim 4, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

9. The optical film according to claim 1, wherein the adjusting particles further comprise a second type of adjusting particles;

wherein for each of the second type of adjusting particles, the second type of adjusting particle has a plurality of second cross sections having respective second circumscribed circles, a ratio of a length of a long axis of the second type of adjusting particle to a diameter of one of the second circumscribed circles which has a largest diameter is greater than or equal to 1, and the ratio of the length of the long axis of the second type of adjusting particle to the diameter of the one of the second circumscribed circles which has the largest diameter is less than 5.

10. The optical film according to claim 9, wherein the second type of adjusting particle comprises at least one type selected from a first sub-type of adjusting particle, a second sub-type of adjusting particle, a third sub-type of adjusting particle, a fourth sub-type of adjusting particle, and a fifth sub-type of adjusting particle which are different in shape from each other; and the first type of adjusting particle comprises at least one type selected from a sixth sub-type of adjusting particle, a seventh sub-type of adjusting particle, an eighth sub-type of adjusting particle, a ninth sub-type of adjusting particle, and a tenth sub-type of adjusting particle which are different in shape from each other;

wherein a variation value of diameters of the second circumscribed circles of the first second cross sections of the first sub-type adjusting particle is less than or equal to 0.3 μm along an extension direction of a long axis of the first sub-type adjusting particle;

a first portion and a second portion of the second sub-type adjusting particle are connected with each other, diameters of the second circumscribed circles of the second cross sections of the first portion of the second sub-type adjusting particle gradually decrease in a direction away from the second portion of the second sub-type adjusting particle, and diameters of the second circumscribed circles of the second cross sections of the second portion of the second sub-type adjusting particle gradually decrease in a direction away from the first portion of the second sub-type adjusting particle;

a variation value of diameters of the second circumscribed circles of the second cross sections of a middle portion of the third sub-type adjusting particle is less than or equal to 1 μm in an extension direction of a long axis of the third sub-type adjusting particle; in a direction away from the middle portion of the third sub-type adjusting particle, diameters of the second circumscribed circles of the second cross sections of a first portion of the third sub-type adjusting particle gradually decrease, and a variation value of diameters of the second circumscribed circles of the second cross sections of a second portion of the third sub-type adjusting particle is less than or equal to 1 μm;

a variation value of diameters of the second circumscribed circles of the second cross sections of a middle portion of the fourth sub-type adjusting particle is less than or equal to 1 μm in an extension direction of a long axis of the fourth sub-type adjusting particle; in a direction away from the middle portion of the fourth sub-type adjusting particle, diameters of the second circumscribed circles of the second cross sections of a first portion of the fourth sub-type adjusting particle gradually decrease, and diameters of the second circumscribed circles of the second cross sections of a second portion of the fourth sub-type adjusting particle gradually decrease;

a first portion and a second portion of the fifth sub-type adjusting particle are connected to each other, and diameters of the second circumscribed circles of the second cross sections of the fifth sub-type adjusting particle gradually decrease along a direction from the first portion of the fifth sub-type adjusting particle to the second portion of the fifth sub-type adjusting particle;

a variation value of diameters of the first circumscribed circles of the first cross sections of the sixth sub-type adjusting particle is less than or equal to 0.3 μm along an extension direction of a long axis of the sixth sub-type adjusting particle;

a variation value of diameters of the first circumscribed circles of the first cross sections of a middle portion of the seventh sub-type adjusting particle is less than or equal to 1 μm in an extension direction of a long axis of the seventh sub-type adjusting particle; in a direction away from the middle portion of the seventh sub-type adjusting particle, diameters of the first circumscribed circles of the first cross sections of a first portion of the seventh sub-type adjusting particle gradually decrease, and a variation value of diameters of the first circumscribed circles of the first cross sections of a second portion of the seventh sub-type adjusting particle is less than or equal to 1 μm;

a variation value of diameters of the first circumscribed circles of the first cross sections of a middle portion of the eighth sub-type adjusting particle is less than or equal to 1 μm along an extension direction of a long axis of the eighth sub-type adjusting particle; in a direction away from the middle portion of the eighth sub-type adjusting particle, diameters of the first circumscribed circles of the first cross sections of a first portion of the eighth sub-type adjusting particle gradually decrease, and diameters of the first circumscribed circles of the first cross sections of a second portion of the eighth sub-type adjusting particle gradually decrease;

a first portion and a second portion of the ninth sub-type adjusting particle are connected to each other, and diameters of the first circumscribed circles of the first cross sections of the ninth sub-type adjusting particle gradually decrease in a direction from the first portion of the ninth sub-type adjusting particle to the second portion of the ninth sub-type adjusting particle;

a first portion and a second portion of the tenth sub-type adjusting particle are connected to each other, diameters of the first circumscribed circles of the first cross sections of the first portion of the tenth sub-type adjusting particle gradually decrease in a direction away from the second portion of the tenth sub-type adjusting particle, and diameters of the second first circumscribed circles of the first cross sections of the second portion of the tenth sub-type adjusting particle gradually decrease in a direction away from the first portion of the tenth sub type adjusting particle.

11. The optical film according to claim 9, wherein a mass fraction of the second type of adjusting particles in the adjusting particles is greater than 50%, and a mass fraction of the first type of adjusting particles in the adjusting particles is less than 50%.

12. The optical film according to claim 1, wherein the base material comprises a first sub-base material and/or a second sub-base material, the first sub-base material is selected from at least one of an unmodified polyester or an unmodified cellulose acetate, and the second sub-base material is selected from at least one of a modified polyester or a modified cellulose acetate;

wherein a mass fraction of the first sub-base material in the base material is greater than or equal to 65%, and a mass fraction of the first sub-base material in the base material is less than or equal to 100%;

a mass fraction of the second sub-base material in the base material is greater than or equal to 0%, and a mass fraction of the second sub-base material in the base material is less than or equal to 35%.

13. A polarizer comprising an optical film, the optical film comprising:

a base material; and adjusting particles dispersed within the base material;

wherein the optical film has an in-plane retardation value, and the in-plane retardation value of the optical film is less than 3000 nm;

wherein the adjusting particles comprise a type of adjusting particles, for each of the type of adjusting particles, the type of adjusting particle has a plurality of cross sections having respective circumscribed circles, a ratio of a length of a long axis of the type of adjusting particle to a diameter of one of the circumscribed circles which has a largest diameter is greater than or equal to 5 and less than 10, and the ratio of the length of the long axis of the type of adjusting particle to the diameter of the one of the circumscribed circles which has the largest diameter is greater than 10 and less than or equal to 50;

wherein the length of the long axis of the type of adjusting particle is greater than or equal to 1 μm, and less than or equal to 200 μm.

14. The polarizer according to claim 13, wherein the in-plane retardation value of the optical film is less than or equal to 1000 nm.

15. The polarizer according to claim 14, wherein the in-plane retardation value of the optical film is less than or equal to 500 nm.

16. The polarizer according to claim 15, wherein the in-plane retardation value of the optical film is less than or equal to 200 nm.

17. The polarizer according to claim 13, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

18. The polarizer according to claim 14, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

19. The polarizer according to claim 15, wherein the optical film has a thickness-direction retardation value, a ratio of the in-plane retardation value of the optical film to the thickness-direction retardation value of the optical film is greater than 0.1, and a ratio of the in-plane retardation value of the optical film to the thickness-direction retardation value of the optical film is less than 2.

20. A display device comprising a polarizer comprising an optical film, the optical film comprising:

a base material; and adjusting particles dispersed within the base material;

wherein the optical film comprises an in-plane retardation value, and the in-plane retardation value of the optical film is less than 3000 nm;

wherein the adjusting particles comprise a type of adjusting particles, for each of the type of adjusting particles, the type of adjusting particle has a plurality of cross sections having respective circumscribed circles, a ratio of a length of a long axis of the type of adjusting particle to a diameter of one of the circumscribed circles which has a largest diameter is greater than or equal to 5 and less than 10, and the ratio of the length of the long axis of the type of adjusting particle to the diameter of the one of the circumscribed circles which has the largest diameter is greater than 10 and less than or equal to 50;

wherein the length of the long axis of the type of adjusting particle is greater than or equal to 1 μm, and less than or equal to 200 μm.

* * * * *